Oct. 7, 1947.  C. B. STADUM  2,428,592
ELECTRONIC CONTROL CIRCUITS
Filed Aug. 15, 1944  2 Sheets-Sheet 2

Fig.2.

WITNESSES:
E. A. McCloskey
John P. Shipman

INVENTOR
Clarence B. Stadum.
BY
F. W. Lyle.
ATTORNEY

Patented Oct. 7, 1947

2,428,592

UNITED STATES PATENT OFFICE 2,428,592

ELECTRONIC CONTROL CIRCUITS

Clarence B. Stadum, Edgewood, Pa., assignor to Westinghouse Electric Corporation, East Pittsburgh, Pa., a corporation of Pennsylvania Application August 15, 1944, Serial No. 549,547

11 Claims. (Cl. 250—27)

This invention relates to electronic control circuits, and has particular relation to control circuits for apparatus for supplying a single pulse of unidirectional current from a source of alternating potential to a load, which pulse is of a short duration less than a period of the alternating potential.

In welding materials of high current and thermal conductivity, such as aluminum and copper wire, it is necessary to have a very high current in the secondary of the welding transformer for a very short period of time. The period of time of current flow ordinarily corresponds to less than a period of a sixty cycle alternating potential. The exact length of the time period is rather critical as it determines the heat developed at the welding point and any inconsistency results in a poor weld or no weld at all.

Electronic circuits for controlling the supply of current to a welding transformer in unidirectional pulses of less than a period of the alternating potential as constructed in accordance with the teachings of the prior art, includes an electric discharge device of the arc-like type, such as an ignitron, connected in series with the primary of the welding transformer across the alternating potential supply lines. The firing of the ignitron is then controlled by a timing circuit which is usually made up of a number of elements including several tubes, transformers and apparatus for providing direct current biasing potentials. These prior controls operate satisfactorily, but the number of elements involved cause the controls to be rather expensive, both in original and maintenance costs.

It is accordingly an object of my invention to provide a new and improved electronic control circuit for use in supplying a single pulse of unidirectional current to a load.

Another object of my invention is to provide a novel and improved apparatus for supplying a pulse of unidirectional current to a load from an alternating potential source, the duration of the pulse being less than a period of the alternating potential.

More specifically, it is an object of my invention to provide novel apparatus for supplying a pulse of unidirectional current to a load from a source of alternating potential, the duration of the pulse being less than a period of the alternating potential, in which the number of elements and the costs thereof is held to a minimum.

In accordance with my invention, a capacitor is connected in series with an electric valve across alternating potential supply lines. A control circuit connected to the valve conditions it to conduct current in half periods of the alternating potential of one polarity, whereby the capacitor is charged. Switch means, such as a relay, is provided which is operable to open the connection of the electric valve and capacitor across the supply lines and to connect the capacitor in series circuit with the valve and the ignition electrode of an ignitron which is in series with the load across the alternating potential supply lines. The connection is such that, when the valve is again conditioned to conduct current, the capacitor is discharged through the ignition electrode to render the ignitron conductive. The control circuit may also include means effective after the operation of the relay to cause the valve to be rendered conductive at a preselected instant in a half period of the alternating potential.

The novel features, which I consider characteristic of my invention, are set forth with greater particularity in the appended claims. The invention itself, however, both as to its organization and method of operation, may be best understood from the following description of a specific embodiment thereof, with reference to the accompanying drawings in which:

Fig. 2 shows a series of curves illustrating the operation of the apparatus of Fig. 1.

Figure 1:
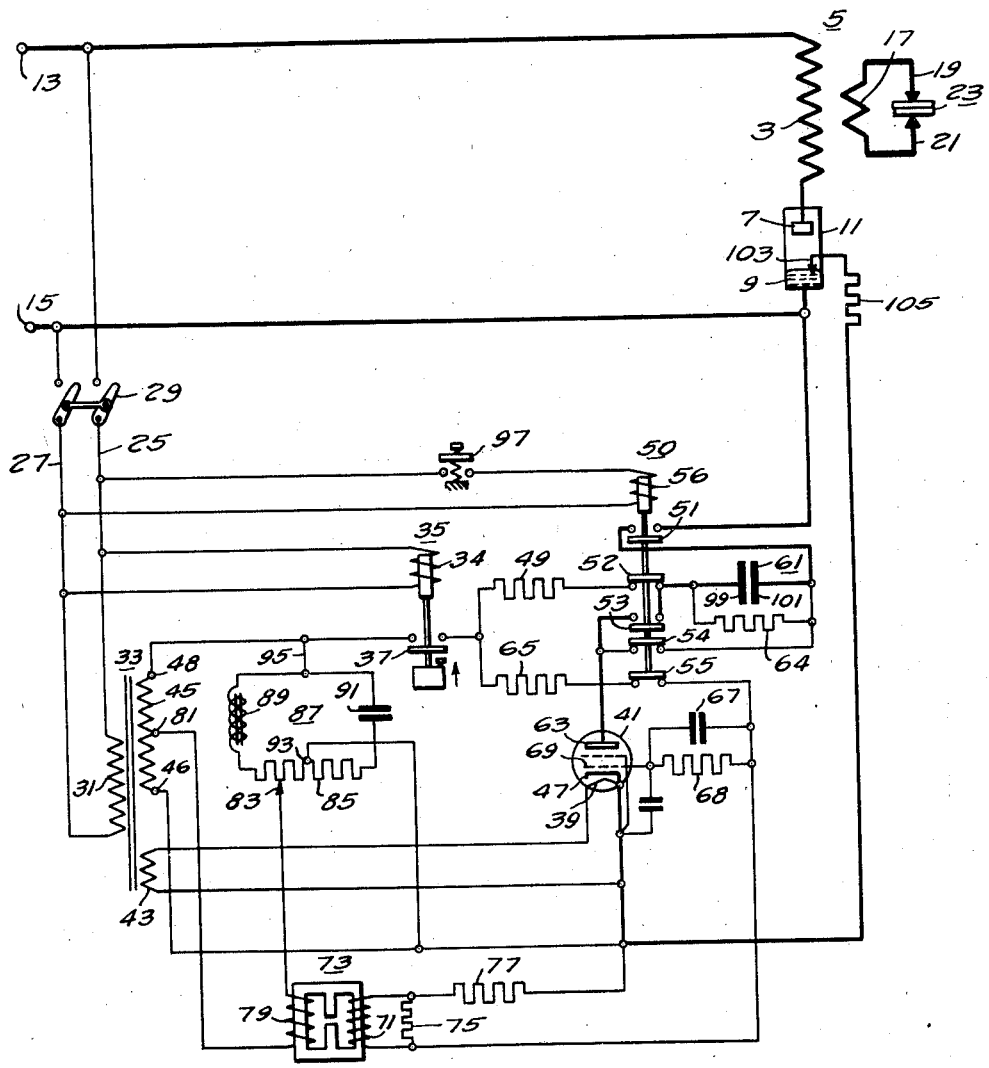
Figure 1 is a circuit diagram illustrating my invention.

As shown in Fig. 1, the primary winding 3 of a welding transformer 5 is connected in series with the anode 7 and cathode 9 of an electric discharge device 11 of the arc-like type, such as an ignitron, across a pair of terminals 13 and 15 which are adapted to be connected to a source of alternating potential. The secondary winding 17 of the welding transformer 5 is connected in circuit with a pair of welding electrodes 19 and 21 and the material 23 to be welded which is clamped therebetween.

A pair of auxiliary supply lines 25 and 27 is connected to the alternating potential terminals through a circuit breaker 29. The primary winding 31 of an auxiliary transformer 33 is connected across the auxiliary supply lines 25 and 27 as is the operating coil 34 of a time delay relay 35. The contact member 37 of the relay 35 does not close until a predetermined time interval after the closure of the circuit breaker 29. This time interval is of the order of five minutes and prevents the operation of the apparatus until the filament 39 of an electric discharge valve 41 of the arc-like type, such as a thyratron, is sufficiently heated. This filament 39 is heated by current from a secondary winding 43 of the transformer 33.

Another secondary winding 45 of the auxiliary transformer 33 has one terminal 46 connected to the cathode 47 of the valve 41. The other terminal 48 of the secondary winding 45 is connected through the contactor 37 of the time delay relay 35, a resistor 49, a contactor 52 of a main relay 50, a capacitor 61, another contactor 54 of the main relay 50 to the anode 63 of the valve 41. A large bleeder resistor 64 is connected directly across the capacitor 61 to effect a complete discharge of the capacitor when the apparatus is not in operation.

The other terminal 48 of the secondary winding 45 is also connected through another resistor 65, another contactor 55 of the main relay 50, a second capacitor 67 and a resistor 68 in parallel therewith to the control grid 69 of the valve 41. The control grid 69 is also connected in a circuit extending through the second capacitor 67 and the resistor 68 in parallel therewith, the secondary winding 71 of a peaking transformer 73 and a resistor 75 in parallel therewith, and another resistor 77 to the cathode 47.

The primary winding 79 of the peaking transformer 73 has one end connected to a center tap 81 on the secondary winding 45 of the auxiliary transformer 33 and the other end connected to an adjustable tap 83 on a resistor 85 forming part of a phase shifting circuit 87. The phase shifting circuit 87 includes an inductive coil 89 and a third capacitor 91 in addition to the resistor 85. The center tap 93 of the resistor 85 is connected to the first terminal 46 of the secondary winding 45 of the auxiliary transformer 33. A complete circuit is then formed from the terminal 46 of the secondary winding 45 to the center tap 93 of the resistor 85 and thence through parallel circuits consisting of one-half of the resistor 85 and the inductive coil 89 on one side, and the other half of the resistor 85 and the third capacitor 91 on the other side, and a conductor 95 to the other terminal 48 of the secondary winding 45. An alternating potential then appears between the center tap 81 of the secondary winding 45 and the adjustable tap 83 on the resistor 85 which is of the same frequency as the alternating potential of the supply lines, but is displaced in phase with respect thereto by an amount depending upon the position of the adjustable tap 83.

The operating coil 56 of the main relay 50 is connected across the supply lines 25 and 27 through a manually operated switch 97, such as a push button switch. When the main relay 50 is energized, the second, fourth and fifth contactors 52, 54 and 55 open the circuit between the terminal 48 of the secondary winding 45 and the anode 63 of the valve 41 and the circuit between the terminal 48 and the control electrode 69. Immediately thereafter, the first and third contactors 51 and 53 of the main relay 50 close a circuit in which the first plate 99 of the first capacitor 61, which had formerly been connected to the terminal 48 of the secondary winding 45, is connected to the anode 63 of the valve 41, and the other plate 101 of the first capacitor 61 is connected to the cathode 9 of the ignitron 11. A discharge circuit for the capacitor 61 is then completed by a connection between the ignition electrode 103 of the ignitron 11 and the cathode 47 of the valve 41 through a resistor 105.

The operation of the circuit described with respect to Fig. 1 may be better understood by referring to the curves of Fig. 2. In these curves voltage and current is plotted against time as indicated. Curve 107 indicates the alternating voltage appearing across the terminals 13 and 15, while curve 109 represents the voltage between the control grid 69 and cathode 47 of the valve 41. Dotted line curve 111 represents the voltage appearing across the two resistors 75 and 77 in the control circuit of the valve 41, while broken line 113 represents the voltage appearing across the second capacitor 67 in the control circuit of the valve 41.

Let it be assumed that the contactor 37 of the time delay relay 35 is closed at the point 115. A potential then appears between the control grid 69 and cathode 47 of the valve 41 which is made up of an alternating potential from the secondary winding 45 of the auxiliary transformer 33, a phase shifted peak voltage impulse provided through the peaking transformer 73, and the voltage appearing across the second capacitor 67. The voltage curve 111 across the resistors 75 and 77 in the control circuit of the valve 41 is made up of the alternating potential across the resistors with the peak voltage impulse superimposed thereon as shown at 117.

At the time of closure of the contactor 37 of the time delay relay 35, no voltage appears across the second capacitor 67. When the control grid-cathode voltage of valve 41 rises above the zero line, the control grid 69 acts as an anode and current is conducted from the terminal 48 of the secondary winding 45 through the resistor 65, the second capacitor 67, the grid 69 and cathode 47 of the valve 41 to the first terminal 46 of the secondary winding. As the resistor 68 across the second capacitor 67 is comparatively large most of the grid-cathode current passes through the second capacitor 67 to charge the same. During the period of current flow through the grid 69, the grid-cathode voltage remains substantially constant as shown at 119 on curve 109. At the same time the second capacitor 67 is partially charged in a direction tending to make the grid 69 more negative with respect to the cathode 47 as shown at 121 on curve 113.

For the purposes of illustration only, it is assumed that the critical potential above which the grid-cathode voltage curve 109 must rise to render the valve 41 conductive corresponds with the zero line. Consequently, when the grid-cathode voltage curve 109 first rises above the zero line at 123, the valve 41 becomes conductive and current flows from the secondary winding 45 through the first capacitor 61 and the valve 41 to charge the first capacitor. As the valve 41 is of the arc-like type, it ceases to conduct at the end of each positive half period of the alternating potential in which it is rendered conductive. Therefore, almost all of the charge established on the first capacitor 61 during a positive half period is maintained thereon during the succeeding negative half period, the only discharge being through the large bleeder resistor 64.

When the grid-cathode voltage 109 again becomes positive in the next positive half period of the alternating potential, the valve 41 is again rendered conductive to permit an additional charge on the first capacitor 61. In addition, current flows from the grid 69 to the cathode 47 to increase the charge on the second capacitor 67 as at 125 on curve 113. After a few periods of the alternating potential, the first capacitor 61 becomes charged to the peak voltage of the secondary winding 45 of the transformer 33 so that the valve 41 no longer becomes conductive in a positive half period when it is conditioned to conduct current by the grid-cathode voltage.

If the push button switch 97 is now closed, the main relay 50 is energized as at point 127. As previously mentioned, energization of the main relay 50 opens the charging circuit for the first capacitor 61 and connects it in series with the ignitron electrode 103 and cathode 9 of the ignitron 11 through the valve 41, the positive plate 99 of the charged first capacitor 61 now being connected to the anode 63 of the valve 41. Energization of the main relay 50 also opens the charging circuit for the second capacitor 67. The second capacitor 67 now begins to discharge at a predetermined rate through the resistor 68 in circuit therewith. The grid-cathode voltage curve 109 no longer has an alternating potential component and consists merely of the biasing voltage provided by the second capacitor 67 as indicated at 129 and the peaking voltage supplied from the peaking transformer 73 as illustrated at 131. Consequently, the grid-cathode voltage curve 109 will first rise above the zero line at an instant in a half period at which the peaked voltage impulse is supplied as at 133. This instant is preselected by adjustment of the tap 83 on the phase shifting circuit 87. At the instant the grid-cathode voltage curve 109 first rises above the zero line at 133, the valve 41 is rendered conductive to discharge the first capacitor 61 through the ignition electrode 103 of the ignitron 11. Such a discharge supplies sufficient current through the ignition electrode as indicated by curve 135 to render the ignitron 11 conductive and a single pulse of current as shown by curve 137 flows from the alternating potential terminals 13 and 15 through the primary winding 3 and the ignitron 11 to produce a weld.

It is to be noted that the second capacitor charges in a very short time to a voltage such that when the main relay 50 is energized, the valve 41 is not rendered conductively a peaked voltage impulse upon the second capacitor 67 discharges slightly.

If after the weld is made the push button switch 97 is released to effect deenergization of main relay 50 at some point 139, recharging of the first and second capacitors 61 and 67 is begun and a new weld may be made by reclosing the push button switch 97 after the recharging is completed.

It is to be noted that the control circuit described employs but a single control valve 41 which is used both in charging and discharging the capacitor 61. In addition, the circuit provides a self-biasing action for the valve 41, so that apparatus for producing a direct current biasing potential is unnecessary. These features enable the provision of a very inexpensive but accurate control.

Although I have shown and described a specific embodiment of my invention, I realize that other embodiments may be made within the spirit of my invention. I do not intend, therefore, to restrict my invention to the specific embodiment illustrated.

I claim as my invention:

1. Apparatus for supplying a pulse of current from a pair of alternating potential supply lines to a load, comprising a capacitor, an electric valve, circuit means connecting said capacitor and valve in series across said lines, control means connected to said valve for conditioning it to conduct current in half-periods of said alternating potential of one polarity whereby said capacitor is charged, said circuit means including switch means operable to open the connection of said valve and capacitor across said lines and to connect said capacitor in series circuit with said valve and said load to effect a discharge of said capacitor through said load when said valve is thereafter conditioned to conduct current.

2. Apparatus for supplying a pulse of current from a pair of alternating potential supply lines to a load, comprising a capacitor, an electric valve of the arc-like type, circuit means connecting said capacitor and valve in series across said lines, control means connected to said valve for conditioning it to conduct current whereby said capacitor is charged, and switch means operable to open the connection of said valve and capacitor across said lines and to connect said capacitor in series circuit with said valve and said load to effect a discharge of said capacitor through said load when said valve is thereafter conditioned to conduct current, said control means including means effective after said switch means is operated to cause said valve to become conductive at a predetermined instant in a period of said alternating potential.

3. Apparatus for supplying a pulse of current to a load from a source of alternating potential, comprising an electric discharge device of the arc-like type having a pair of principal electrodes adapted to be connected in circuit with said load across said source and having an ignition electrode in contact with one of said principal electrodes, a capacitor, an electric valve, a pair of auxiliary supply lines adapted to be connected across said source, circuit means connecting said capacitor and valve in series across said lines, control means connected to said valve for conditioning it to conduct current in half periods of said alternating potential of a polarity in which said one principal electrode is negative with respect to the other whereby said capacitor is charged, said circuit means including switch means operable to open the connection of said valve and capacitor across said lines and to connect said capacitor in series circuit with said valve and said ignition electrode and one principal electrode to effect a discharge of said capacitor through said ignition electrode when said valve is thereafter conditioned to conduct current.

4. Apparatus for supplying a pulse of current from a source of alternating potential to a load, comprising an electric discharge device of the arc-like type having a pair of principal electrodes adapted to be connected in circuit with said load across said source and having an ignition electrode in contact with one of said principal electrodes, a capacitor, an electric valve of the arc-like type, a pair of auxiliary supply lines adapted to be connected across said source, circuit means connecting said capacitor and valve in series across said lines, control means connected to said valve for conditioning it to conduct current whereby said capacitor is charged, said circuit means including switch means operable to open the connection of said valve and capacitor across said lines and to connect said capacitor in series circuit with said valve and said ignition electrode and one principal electrode to effect a discharge of said capacitor through said ignition electrode when said valve is thereafter conditioned to conduct current, said control means including means effective after said switch means is operated to cause said valve to become conductive at a preselected instant in a half period in which said one principal electrode is negative relative to the other.

5. Apparatus for supplying a pulse of current from a source of alternating potential to a load, comprising an electric valve, a capacitor, circuit means connecting said capacitor and valve in a series circuit adapted to be connected across said source, control means for rendering said valve conductive in half-periods of said alternating potential of one polarity when a voltage of said one polarity exists across said valve whereby the capacitor is charged, said circuit means including switch means operable to open said series circuit and to connect said capacitor, said load and said valve in a second series circuit with the charge on said capacitor establishing a voltage of said one polarity across said valve whereby the capacitor is discharged through said load when the valve becomes conductive after operation of said switch means.

6. Apparatus for supplying a pulse of current from a source of alternating potential to a load, comprising an electric discharge device of the arc-like type having an anode and a cathode of the pool type adapted to be connected in circuit between said source and load, said device having an ignition electrode immersed in said cathode, an electric valve, a capacitor, circuit means connecting said capacitor and valve in a series circuit adapted to be connected to said source, control means for rendering said valve conductive in half periods of said source potential of a polarity in which said anode is positive relative to the cathode when a voltage of said polarity exists across said valve whereby the capacitor is charged, said circuit means including switch means operable to open said series circuit and to connect said capacitor, valve, ignition electrode and cathode in a second series circuit with the charge on the capacitor establishing a voltage of said polarity across said valve whereby said capacitor is discharged through said ignition electrode when said valve becomes conductive after operation of said switch means to render said device conductive.

7. Apparatus for supplying a pulse of current to a load from a pair of alternating potential supply lines, comprising an electric valve of the arc-like type having an anode, cathode and control electrode, a first capacitor, first circuit means connecting said first capacitor, anode and cathode in a series circuit across said lines, a control circuit connected between said control electrode and cathode, means for impressing in said control circuit a peaked voltage impulse making said control electrode more positive with respect to said cathode at a preselected instant in half-periods of said alternating potential in which the first supply line to which said anode is connected is positive, second circuit means connecting an intermediate point on said control circuit to said first supply line, said control circuit including a capacitor connected between said control electrode and intermediate point and an impedance element connected between said intermediate point and cathode whereby said valve becomes conductive in half-periods in which said first supply line is positive to charge said first capacitor, current from said point through said second capacitor, control electrode and cathode being effective to charge said second capacitor at the same time, switch means associated with said first and second circuit means to open said series circuit and the connection between said point and said first supply line and to connect said first capacitor, said load and said anode and cathode in a second series circuit with the charge on said first capacitor causing a positive anode to cathode voltage, the charge on said second capacitor tending to maintain said control electrode negative relative to said cathode, and a resistor connected across said second capacitor to discharge same, said valve being rendered conductive after operation of said switch means by one of said peaked impulses.

8. Apparatus for supplying a pulse of current to a load from a source of alternating potential, comprising an electric discharge device of the arc-like type having a pair of principal electrodes adapted to be connected between said source and load and having an ignition electrode in contact with one of said principal electrodes, an electric valve of the arc-like type having an anode, cathode and control electrode, a first capacitor, a pair of supply lines adapted to be connected across said source, first circuit means connecting said first capacitor, anode and cathode in a series circuit across said lines, a control circuit connected between said control electrode and cathode, means for impressing in said control circuit a peaked voltage impulse making said control electrode more positive with respect to said cathode at a preselected instant in half periods of said alternating potential in which the first supply line to which said anode is connected is positive, second circuit means connecting an intermediate point on said control circuit to said first supply line, said control circuit including a capacitor connected between said control electrode and point and an impedance element connected between said point and cathode, whereby said valve becomes conductive in half periods in which said first supply line is positive to charge said first capacitor, current from said point through said second capacitor, control electrode and cathode being effective to charge said second capacitor at the same time, switch means associated with said first and second circuit means to open said series circuit and the connection between said point and said first supply line and to connect said first capacitor, said ignition electrode and said one principal electrode of said device, and the anode and cathode of said valve in a second series circuit with the charge on said first capacitor causing a positive anode to cathode voltage, the charge on said second capacitor tending to maintain said control electrode negative relative to said cathode, and a resistor connected across said second capacitor to discharge same, said valve being rendered conductive after operation of said switch means by one of said peaked impulses to render said device conductive.

9. Apparatus for supplying a pulse of current from a pair of alternating potential supply lines to a load comprising a capacitor, an electric valve of the arc-like type, circuit means connecting said capacitor and valve in series across said lines, control means connected to said valve for conditioning it to conduct current whereby said capacitor is charged, and switch means operable to open the connection of said valve and capacitor across said lines and to connect said capacitor in series circuit with said valve and said load to effect a discharge of said capacitor through said load when said valve is thereafter conditioned to conduct current, said control means including adjustable means effective after said switch means is operated to cause said valve to become conductive at an instant in a period of said alternating potential preselected by adjustment of said adjustable means.

10. Apparatus for supplying a pulse of current from a pair of alternating potential supply lines to a load, comprising a capacitor, an electric valve, circuit means connecting said capacitor and valve in series across said supply lines, control means connected to said valve for conditioning it to conduct current, said control means being effective while said capacitor and valve are in series across said line to condition said valve to conduct current in half-periods of the alternating potential of one polarity whereby to effect charging of said capacitor, said circuit means including switch means operable to open the connection of said valve and capacitor across said lines and to connect said capacitor in series circuit with said valve and said load, said control means also being effective to condition said valve to conduct current at a predetermined instant after said switch means is operated whereby to effect a discharge of said capacitor through said load.

11. Apparatus for supplying a pulse of current to a load from a pair of alternating potential supply lines, comprising an electric valve of the arc-like type having an anode, cathode and control electrode, a first capacitor, circuit means connecting said first capacitor, anode and cathode in a series circuit across said lines, a second capacitor having a pair of terminals with one terminal connected to said control electrode, control means connected between the other terminal and said cathode for impressing therebetween an alternating voltage causing said control electrode to become more positive relative to the cathode than said valve's critical potential in half-periods of the potential across said lines in which said anode is positive relative to said cathode, whereby said valve becomes conductive in said half-periods to charge said first capacitor with said second capacitor being charged by current through said capacitor, control electrode and cathode resulting from said alternating voltage, switch means associated with said circuit means and said control means and operable to open said series circuit and the connection of said control means and to connect said first capacitor, said load and said anode and cathode in a second series circuit with the first capacitor's charge causing said anode to be positive relative to said cathode, a discharge circuit having resistance connected across said second capacitor, and means connected to said other terminal and cathode for impressing a voltage impulse therebetween which is effective after said switch means is operated to cause said concontrol electrode to become more positive relative to said cathode than said critical potential at a predetermined instant to render said valve conductive whereby said first capacitor is discharged through said load.

CLARENCE B. STADUM.

REFERENCES CITED

The following references are of record in the file of this patent:

UNITED STATES PATENTS

| Number | Name | Date |
| --- | --- | --- |
| 2,008,730 | Smede | July 23, 1935 |
| 2,306,791 | Moe | Dec. 29, 1942 |
| 2,315,926 | Bivens | Apr. 6, 1943 |
| 2,327,268 | Jenks | Aug. 17, 1943 |

FOREIGN PATENTS

| Number | Country | Date |
| --- | --- | --- |
| 548,236 | Great Britain | Oct. 1, 1942 |